Patented Feb. 15, 1966

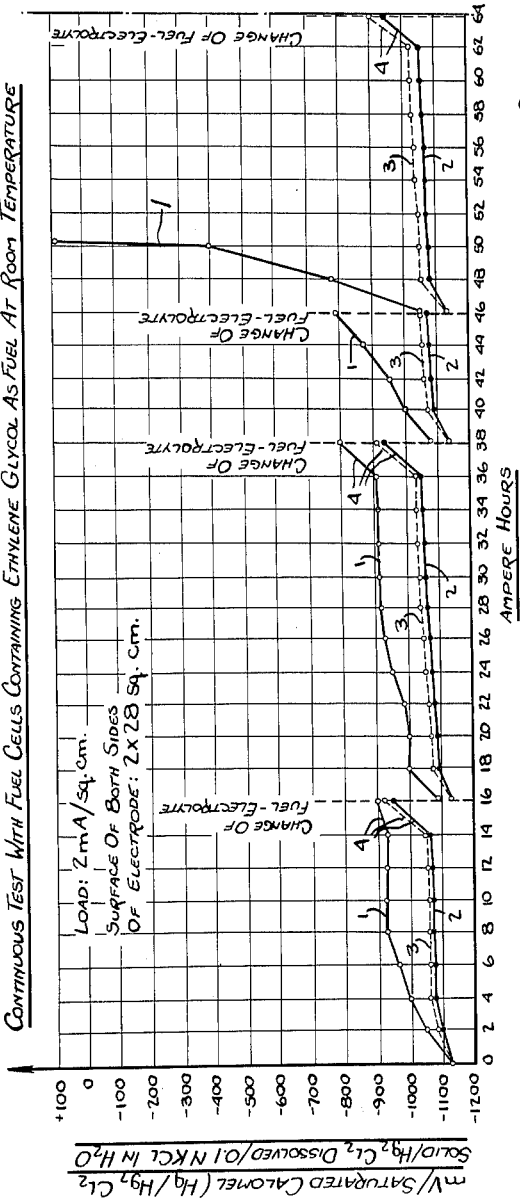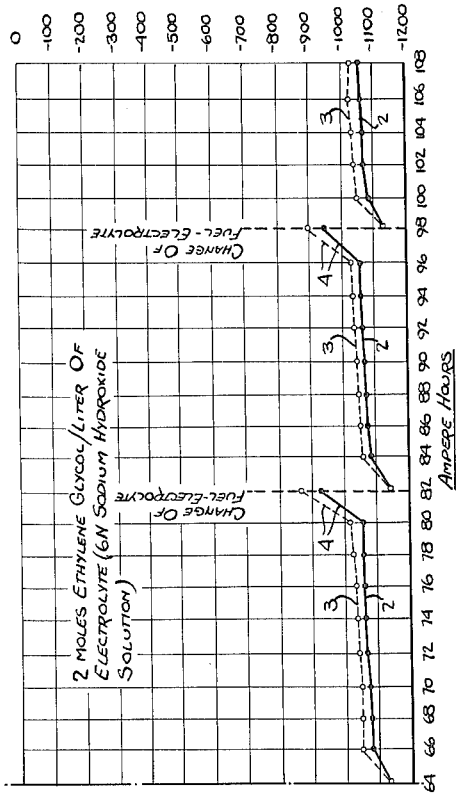

3,235,513
PROCESS FOR ACTIVATING RANEY ALLOYS AND SOLUTION USEFUL FOR SUCH PROCESS
Margarete Jung, Nieder-Eschbach, Taunus, Germany, and Hanns H. Kroeger, Schenectady, N.Y., assignors to Varta Aktiengesellschaft, Frankfurt am Main, Germany, a corporation of Germany
Filed Feb. 2, 1962, Ser. No. 170,700
Claims priority, application Germany, Feb. 7, 1961, A 36,665
2 Claims. (Cl. 252—466)

The present invention relates to the catalytic activation of Raney alloys. Raney catalyst bodies are useful, for instance, as fuel electrodes in galvanic fuel cells.

As is known, Raney alloys are composed of a catalytically active component, for instance, nickel, and a catalytically inactive component, for instance, aluminum, zinc, and others, and they are converted into a catalyst, for instance, a spongy form of nickel, by leaching the inactive component from the alloy with an activating solution capable of dissolving the inactive component, preferably a highly concentrated alkali metal hydroxide solution, for instance, 25% sodium hydroxide solution. The activating solution removes the inactive component, for instance, aluminum or zinc, from the matrix but the pH-value in the resultant pores of the matrix is considerably decreased because the formation of the aluminate uses up alkali metal hydroxide.

An additional difficulty encountered in this activation process with alkali metal hydroxide solutions as they are conventionally used resides in the fact that the diffusion of the alkali metal hydroxide solution into the pores is impeded by the evolution of hydrogen concomitant with the dissolution of the aluminum. This is due to the fact that the alkaline solution which initially has penetrated into the pores develops just sufficient hydrogen with the aluminum to be dissolved that the resulting hydrogen fills the pores almost completely but does not leave the pores but merely pushes the consumed alkaline solution ahead of it and thus prevents further chemical reaction. Because most of the pores are located within the electrode body, large parts of the electrode matrix are only incompletely activated as a result of the hydrogen evolution which impedes penetration of the amount of alkaline solution into the matrix. This disadvantage can be overcome only by forcing the alkaline solution under pressure through the electrode matrix. Incomplete hydrogen evolution as caused by such limited penetration of the alkaline solution into the matrix results in the aluminate being eventually hydrolyzed and forming insoluble aluminum hydroxide which blocks the finest pores, i.e. the most active centers of the catalyst. Accordingly, a Raney catalyst produced in the conventional leaching process rapidly loses its catalytic activity in use and, when used as an electrode in a fuel cell, for instance, the electrode potential is constantly diminished.

It is the primary object of the present invention to overcome these disadvantages of conventional Raney catalyst activation processes.

This and other objects are accomplished by this invention by adding to an otherwise conventional activating solution of the indicated type a compound capable of forming stable complex compounds with the ions of the inactive component of the Raney alloy. This compound may be added to the solution in stoichiometric proportions to the inactive component to be leached from the alloy. All complex forming compounds which are soluble and stable in concentrated alkali metal hydroxide solution and which are substantially non-volatile and do not adversely affect the Raney catalyst, are suitable for the purpose of the present invention. Thus sequestering and/or chelating agents having the above given properties have proved to be useful.

Preferred compounds useful as additives in the activating solution according to the invention include tartrates, such as alkali metal tartrates, particularly potassium sodium tartrate, and aliphatic amino compounds, such as disodium di-hydrogen ethylenediamine tetra-acetate, hexamethylene tetramine, amino acetic acid, nitrilo triacetic acid, uramil di-acetic acid, anilino di-acetic acid, and similar acids.

It is not necessary to employ the complex forming compounds in stoichiometric proportions. On the contrary it was found that satisfactory results can be obtained by adding only 0.02 mole to 0.01 mole of said compounds for each mole of aluminum zinc or magnesium present in the Raney alloy. It is highly surprising that such small amounts effect activation of the Raney alloy, without precipitation of aluminum hydroxide, in a very considerably shorter period of time than when proceeding according to the known processes. While heretofore between about three to four weeks were required, activation is completed within about four days when using the activating solution containing the complex forming compounds according to the present invention.

Activation time, of course, is depending on the size of the Raney alloy particles, on the concentration and temperature of the activating solution, on the manner in which the alkaline solution is agitated, and how often it is replaced by fresh solution.

It is also possible to carry out the activation at a lower temperature than heretofore used. Such operation at lower activation temperature produces Raney catalysts of highest activity. Heretofore, such activation at lower temperature was impractical because the activation duration was excessively prolonged. However, the accelerating effect of the addition of the complex forming compounds according to the present invention permits considerable reduction of the activating temperature, for instance, from 90–100° C. to a temperature of about 50° C. whereby the activation time was still within practically feasible limits.

The following examples will illustrate the process and solutions of the present invention. Examples 1 and 6 being directed to conventional activation processes to serve as a basis of comparison with the results of Examples 2, 3, 4, 5 and 7 which follow the teaching herein disclosed.

*Example 1*

200 g. of pieces of a Raney nickel alloy (50% aluminum, 50% nickel, by weight) with a particle size between about 3 mm. and about 7 mm. were placed into 1.5 l. of a 6 N sodium hydroxide solution.

The mixture was stirred at a temperature of about 80° C. for 4 days. The sodium hydroxide solution was withdrawn and replaced by fresh solution every day.

The resultant spongy nickel catalyst was filled in a sieve-electrode with a thickness of 5 mm., each of the two surfaces of the electrode having a geometrical extension of 28 sq. cm., the sieve meshes having an average diameter of 0.05 mm. This electrode was used in a fuel cell, the electrolyte being a 6 N sodium hydroxide solution containing 2 moles of ethylene glycol per liter of electrolyte. As shown in the attached graph by curve 1 the initial average potential measured against a saturated $Hg_2Cl_2$-solution (a so-called "calomel-electrode") was $-1135$ mv. When a load of 2 ma./sq. cm. was applied to the cell, the potential average over a continuous operating time of 16 a.h., at room temperature, about $-990$ mv. against $Hg/Hg_2Cl_2\,sat/KCL=sol._{sat}$. After the mixture of electrolyte and ethylene glycol was changed, the new rest potential was $-1100$ mv. and deteriorated after another 34 a.h. of operation to $+100$ mv. (electrodes useless). The abrupt rise of curves 1, 2 and 3—indicated in the graph by curve portion 4—was due to the fact that almost all glycol fuel HO—CH$_2$—CH$_2$—OH had been converted into glycolic acid $$HO-CH_2-C\begin{matrix}\nearrow O \\ \searrow OH\end{matrix}$$

In order to produce again comparable conditions, the electrolyte containing the new fuel (glycolic acid) was replaced by the same quantity of 6 N sodium hydroxide solution, containing 2 moles of ethylene glycol per liter of electrolyte.

*Example 2*

The same Raney nickel alloy pieces as in Example 1 were activated with the same sodium hydroxide solution to which 10 g. of potassium sodium tartrate of the formula KOOC—(CHOH)$_2$—COO Na.4H$_2$O had been added. Activation was completed by stirring from time to time at a temperature of about 60° C. for 22 hours whereby it was not necessary to replace the potassium sodium tartrate-containing alkaline solution. After activation is completed, the activated Raney nickel is ready for use.

When placed as negative electrode into the same fuel cell as in Example 1 and treated under the same conditions, this catalyst showed—see curve 2—an initial average rest potential of —1135 mv. against Hg/Hg$_2$Cl$_2$ sat./KCL—sol.sat.(calomel-electrode)

After 14 a.h. of operation at room temperature and a load of 2 ma./sq. cm., the electrode showed an average potential of —1080 mv. After changing the mixture of electrolyte and fuel the average rest potential was —1135 mv. and it deteriorated after another 34 a.h. operating hours (room temperature and 2 ma./sq. cm. load) only to —1080 mv. After another 58 a.h. (sum total: 108 a.h.) the average potential measured against the calomel-electrode was continually —1080 mv. Thereupon the experiment was broken off.

*Example 3*

The activating process of Example 2 was repeated but the additive was di-sodium di-hydrogen ethylenediamine tetra-acetate of the formula $$\begin{matrix}HOOC-CH_2 \\ \diagdown \\ NaOOC-CH_2\end{matrix}N-CH_2-CH_2-N\begin{matrix}CH_2-COOH \\ \diagup \\ CH_2-COONa\end{matrix}$$

Comparative measurement in fuel cells—as illustrated in the attached graph by curve 3—showed the same initial potential as in Example 2, an average potential of —920 mv. after 16 a.h., a rest potential of —1135 mv. after the electrolyte change and a deterioration only to —1050 mv. after another 34 a.h.

*Example 4*

The activating process of Example 2 was repeated but 6 g. of hexamethylene tetramine were added in place of the potassium sodium tartrate. The Raney alloy particles had a particle size between about 0.01 mm. and about 0.1 mm. and were composed of 73% of zinc, 10% of nickel, 9.3% of cobalt and 7.7% of silver by weight. Activation was completed by stirring from time to time at a temperature of about 40° C. for 12 hours. It was not necessary to replace the activator-containing alkaline solution.

The potentials were substantially the same as given in Example 2.

*Example 5*

The activating process of Example 2 was repeated but 10 g. of nitrilo tri-acetic acid were added in place of the potassium sodium tartrate. The Raney alloy was composed of 25% of nickel, 22% of cobalt and 53% of magnesium, by weight. Their particles had a particle size between about 1 mm. and about 2 mm. Activation was completed by stirring from time to time at a temperature of about 25° C. for 21 hours. It was not necessary to replace the activator-containing alkaline solution.

The potentials were substantially the same as given in Example 2.

The foregoing examples describe the activating process of Raney-alloys, which are broken in little pieces before activation. Their properties are determined when placed in pocket-electrodes or sieve-electrodes with openings smaller than the spongy activated particles of the Raney-metal catalyst.

In the following examples the production, activation and effectiveness of sintered electrodes will be described.

*Example 6*

8 g. of Raney nickel powder (containing an equal weight of Ni and Al) having a grain size of 10–12 $\mu$, were intimately mixed with 12 g. of carbonyl nickel powder, having a grain size of 4–5 $\mu$.

The mixture was compressed under a pressure of 4 tons/sq. cm. and sintered in a protective hydrogen atmosphere at a temperature of 680° C. for thirty minutes. The round electrode had a diameter of 40 mm., a thickness of 3 mm., and a weight of 20 g.

The yet inactive electrode was placed in 0.15 l. of a 6 N sodium hydroxide solution. The solution had a temperature of about 50° C. and was withdrawn and replaced daily by fresh solution. Activation was completed without stirring after 22 days.

The resulting electrode was immersed in a 6 N sodium hydroxide solution and was used as a hydrogen-electrode in a fuel cell. The pressure of gaseous hydrogen supplied thereto was 2 atm.

The initial average potential measured against a calomel-electrode was —1130 mv. When a load of 50 ma./sq. cm. was applied to the fuel cell at room temperature for thirty days, the end-potential measured against a saturated calomel-electrode was —960 mv.

*Example 7*

A still inactive electrode, which was made in the same manner as described in Example 6, was placed in 0.15 l. of a 6 N sodium hydroxide solution to which 1 g. of potassium sodium tartrate had been added. The solution had a temperature of about 50° C. In contrast to the activation procedure used in Example 6, it was not necessary to replace the potassium sodium tartrate-containing alkaline solution. After 4 days without stirring activation was completed.

The electrode was immersed in a 6 N sodium hydroxide solution and was used as a hydrogen-electrode in a fuel cell. The pressure of gaseous hydrogen supplied thereto was 2 atm. The initial average potential measured against a calomel-electrode was —1135 mv. When a load of 50 ma./sq. cm. was applied to the fuel cell at room temperature for thirty days, the end-potential measured against a saturated calomel-electrode was —1040 mv.

In place of Raney nickel alloys as used in the preceding examples, there may be employed other Raney alloys, such as Raney cobalt alloy, Raney silver alloy, Raney iron alloy or alloys containing more than one catalytically active metal.

Of course, many changes and variations in the composition of the Raney alloys, of the activating alkaline solution, of the complex forming, sequestering, or chelating agents used, in the activating conditions, temperature, and duration, in the concentration of the activating solution and the amounts of additive added thereto, in the manner in which the resulting catalyst is worked up and used as electrode, and the like may be made by those skilled in the art in accordance with the principles set forth herein and in the claims annexed hereto.

We claim:

1. The process of converting a Raney metal alloy having a catalytically active component and a catalytically inactive component into a catalyst by leaching the inactive component from the alloy with an activating solution capable of dissolving the inactive component, comprising the step of adding to the activating solution a substance selected from the group of alkali metal tartrate and lower aliphatic amino sequestering compounds in an amount of from 0.01 mol to 0.2 mol per mol of the inactive component.

2. The process of converting a Raney metal alloy having a catalytically active component and a catalytically inactive component into a catalyst, comprising the step of immersing the alloy into an activating solution for leaching the inactive component from the alloy, the activating solution being capable of dissolving the inactive component and containing a substance selected from the group of alkali metal tartrate and lower aliphatic amino sequestering compounds in an amount of from 0.01 mol to 0.2 mol per mol of the inactive component.

References Cited by the Examiner

UNITED STATES PATENTS

| | | | |
|---|---|---|---|
| 2,391,283 | 12/1945 | Weber et al. | 252—466 |
| 2,860,175 | 11/1958 | Justi | 136—120 |
| 2,927,088 | 3/1960 | Michalko et al. | 252—466 |
| 2,928,891 | 3/1960 | Justi et al. | 252—466 |
| 3,067,276 | 12/1962 | Gruneberg et al. | 136—120 |
| 3,139,408 | 6/1964 | Tumer et al. | 252—477 |

FOREIGN PATENTS

| | | |
|---|---|---|
| 210,729 | 10/1957 | Australia. |
| 239,130 | 5/1959 | Australia. |
| 568,242 | 12/1958 | Belgium. |

JOHN H. MACK, *Primary Examiner.*

JOHN R. SPECK, *Examiner.*